No. 861,470. PATENTED JULY 30, 1907.
J. G. LANDON.
GRAVE VAULT.
APPLICATION FILED AUG. 21, 1906.
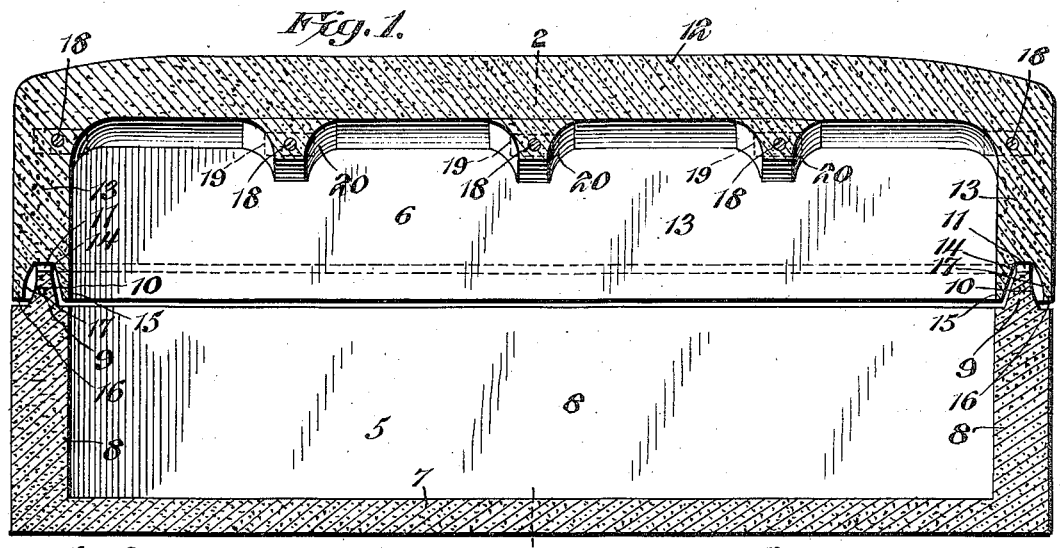
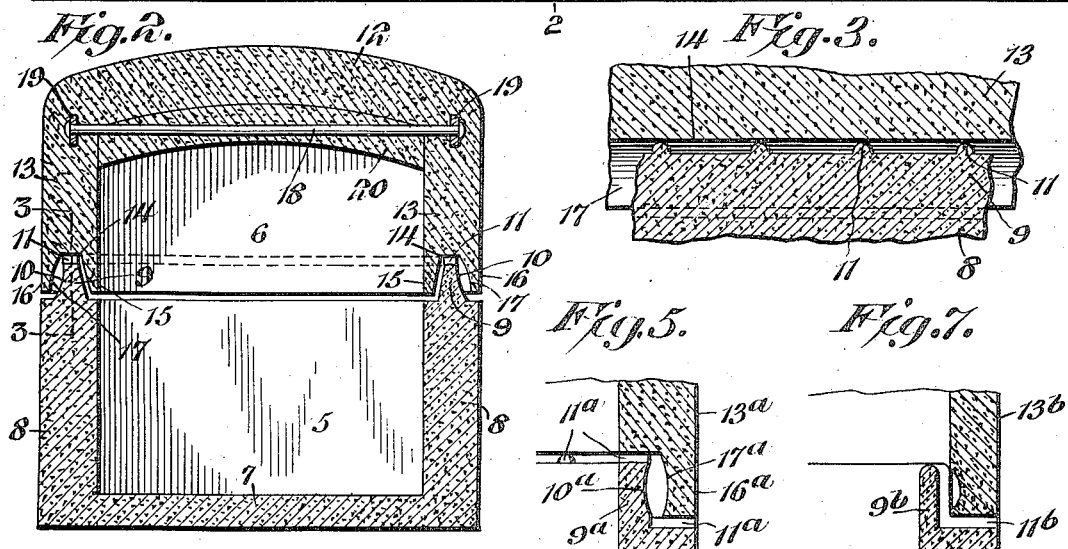
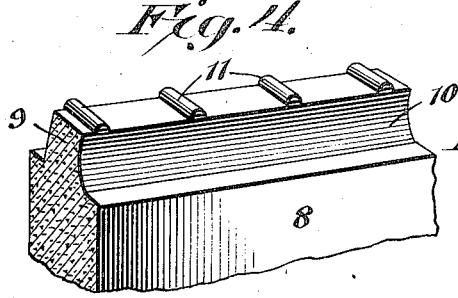
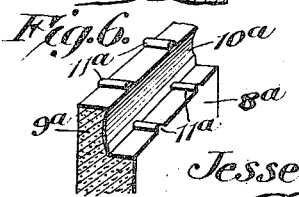
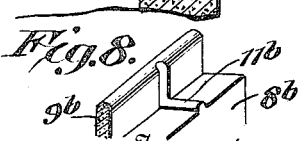
Witnesses
Howard D. Orr
B. L. Foster
Inventor,
Jesse G. Landon,
By C. G. Siggers
Attorney

UNITED STATES PATENT OFFICE.

JESSE G. LANDON, OF FINDLAY, OHIO.

GRAVE-VAULT.

No. 861,470.  Specification of Letters Patent.  Patented July 30, 1907.

Application filed August 21, 1906. Serial No. 331,470.

*To all whom it may concern:*

Be it known that I, JESSE G. LANDON, a citizen of the United States, residing at Findlay, in the county of Hancock and State of Ohio, have invented a new and useful Grave-Vault, of which the following is a specification.

This invention relates to improvements in vaults made of concrete or like composite cementitious material.

The principal object is to provide a novel, simple, and easily constructed vault, which will be strong to withstand the crushing strains incident to its burial in the earth, will permit the escape of gases from its interior, and will prohibit the entrance of moisture thereinto.

Several embodiments of the invention are illustrated in the accompanying drawings, wherein:—

Figure 1 is a longitudinal sectional view through the preferred form of structure. Fig. 2 is a cross sectional view on the line 2—2 of Fig. 1. Fig. 3 is a detail sectional view on the line 3—3 of Fig. 2. Fig. 4 is a detail perspective view of a portion of one of the side walls of the body member. Fig. 5 is a detail cross sectional view through a slightly modified form of construction.
Fig. 6 is a perspective view of a portion of one of the side walls of the body member of the form shown in Fig. 5. Fig. 7 is a detail sectional view through another embodiment of the invention. Fig. 8 is a detail perspective view of the side wall of the body member of the same.

Similar reference numerals designate corresponding parts in all the figures of the drawings.

In the embodiment illustrated in Figs. 1 to 4 inclusive, the vault comprises a body member 5, and a cover member 6, each constituting substantially one-half of said vault, so that their weight will be about equal in order to facilitate handling. The body member 5 comprises a bottom 7 and upstanding side walls 8, the latter being provided with upstanding longitudinally disiposed tapering tongues 9, the outer sides of which are concaved, as shown at 10, said tongues being thinner than the walls. A plurality of spaced transverse ribs 11 are formed upon the upper edges of the tongues.

The cover member consists of an arched top 12, having depending side walls 13, which side walls are provided in their lower edges with longitudinally disposed grooves 14 that receive the tongues, said grooves thus forming inner depending flanges 15 and outer depending flanges 16 that are thinner than the walls carrying them. The inner faces of the outer flanges, or in other words, of the outer walls of the grooves are concaved, as shown at 17. Connecting the upper portions of the side walls 13 of the cover member are tie rods 18, disposed transversely of the top 12, and having their intermediate portions arranged beneath the same. These tie rods have heads 19 at their ends, which heads consist of washers or plates that are embedded in the side walls at their juncture with the top 12. The end tie rods are preferably embedded in the end walls, as shown in Fig. 1, and the intermediate rods are inclosed and protected by transverse arched casing ribs 20, preferably applied after the top has been constructed. These ribs not only serve as inclosures for the tie rods, but also act as reinforcements for the top.

When the cover member is placed upon the body member, it is supported in spaced relation thereto by the transverse ribs 11 of the tongues 9. Consequently passage-ways are provided, which will permit the free escape of gases that may be generated within the vault. On the other hand, the entrance of water is prohibited, for while the water will fill the interior of the channel formed in the joint between the members by the opposite concaved walls, still when this channel is practically full, it acts as a seal, and the air pressure within the vault will prevent the entrance of water thereinto. In explanation of this, it may be stated that the cover member 6 constitutes an air-tight hood, and if the level of the water rises above its lower edge, such water will not enter the lower end of said hood, but a very slight distance. This can be demonstrated by introducing an inverted drinking glass into a vessel of water. The top member acts in the same manner. Now the outer depending flanges 17 overlap the upstanding tongues 9 of the body member. Therefore the air contained within the said cover member will be sealed therein, should water rise to the height of the joint, and consequently, this water will be prohibited from passing inside the cover member for the reasons above stated, and consequently can not pass over the upstanding tongues of the body member. It will thus be seen that the outer depending flanges 16 and the inner upstanding tongues 9 of the body member are essential to keep out water, while the inner flanges 15 are unnecessary, and so far as the sealing action is concerned, may be dispensed with if desired. Moreover, when the level of the water again lowers below the open joint, said joint will be entirely open, for the water will leave it and consequently gases can freely escape therefrom.

As an indication of this, attention is invited to Figs. 5 and 6, wherein the side wall 8ᵃ of a body member is shown, and a side wall 13ᵃ of a cover member is illustrated. The former is provided with an inner upstanding rib 9ᵃ, having its outer face concaved, as shown at 10ᵃ. The side wall 13ᵃ is provided with a depending flange 16ᵃ that extends outside of and below the upper edge of the rib 9ᵃ. The wall 8ᵃ and tongue 9ᵃ, constituting a part thereof, carry transverse spaced ribs 11ᵃ, which thus serve to hold the members in spaced relation to provide the open vent. The inner face of the flange 16ᵃ is concaved as shown at 17ᵃ.

A slightly different form of construction, but one that has the same advantages, is shown in Fig. 7, wherein the side walls of the body member is designated 8ᵇ, while the side wall of the cover member is shown at 13ᵇ. The side wall 8ᵇ has an upstanding tongue 9ᵇ, and is provided with suitable spaced transverse ribs 11ᵇ. The side wall 13ᵇ in this instance has its lower margins extending outside of and below the upper edge of the tongue 9ᵇ, being supported on the ribs 11ᵇ. The opposing inner faces of the tongue 9ᵇ and side wall 13ᵇ are concaved to provide the desired channel between them. It will be observed that this embodiment has substantially the same advantages as the one first described.

From the foregoing, it is thought that the construction, operation, and many advantages of the herein described invention, will be apparent to those skilled in the art, without further description, and it will be understood that various changes in the size, shape, proportion, and minor details of construction, may be resorted to without departing from the spirit or sacrificing any of the advantages of the invention.

Having thus fully described my invention, what I claim as new, and desire to secure by Letters Patent, is:—

1. In a grave vault, a body member having side walls, a cover member provided with side walls having lower marginal portions that extend outside of and below the upper edges of the side walls of the body member, and means interposed between the adjacent portions of the side walls for maintaining them in spaced relation to provide an open vent that communicates with the interior of the vault.

2. In a grave vault, a body member having side walls, a cover member provided with side walls having lower marginal portions that extend outside of and below the upper edges of the side walls of the body member, and spaced transverse ribs interposed between the adjacent portions of the side walls for maintaining them in spaced relation to provide an open vent that communicates with the interior of the vault.

3. In a grave vault, a body member having side walls provided with an outstanding tongue that is thinner than said side walls, a cover member provided with side walls having a depending flange that is thinner than said side walls and extends outside of and below the upper edge of the tongue, and means interposed between the adjacent portions of the side walls of both members for maintaining them in spaced relation to provide an open vent that communicates with the interior of the vault.

4. In a grave vault, a body member, and a cover member, said members having side walls, the side walls of one member being provided in their free edges with a groove, the coöperating edges of the other member having a tongue that fits in the groove, one of the side walls of said tongue being concaved, and the opposed wall of the groove being also concaved, forming an inclosed longitudinal channel in the joint between the members.

5. In a grave vault, a body member, and a cover member, said members having side walls, the side walls of one member being provided in their free edges with a groove, the coöperating edges of the other member having a tongue that fits in the groove, and means carried by one of the members and interposed between said members for spacing the same to allow the escape of gases from the interior of the vault.

In testimony, that I claim the foregoing as my own, I have hereto affixed my signature in the presence of two witnesses.

JESSE G. LANDON.

Witnesses:
W. A. HALL,
ETHEL RECHEY.